Patented Feb. 23, 1937

2,071,457

UNITED STATES PATENT OFFICE 2,071,457

METHOD FOR STABILIZING FATTY OILS AGAINST OXIDATION

Wilson F. Douglass, Council Bluffs, Iowa, assignor to The Cudahy Packing Company, Chicago, Ill., a corporation of Maine No Drawing. Application June 22, 1933, Serial No. 677,171

11 Claims. (Cl. 87—12)

This invention relates to the preservation of fats and oils, and more particularly has reference to a process and agent for the retardation of rancidity in animal fats and oils.

As is well known, rancidity of fats and oils consists in the presence of aldehydic and ketonic odors and flavors which in turn result from oxidation. While agents to prevent or retard such oxidation have been employed in the past, certain disadvantages have inhered in such antioxidants.

Even though in certain instances the oxidation of animal fats and oils might be retarded by the use of those antioxidants used in arts other than the packing industry, (such as in the rubber and petroleum arts) practically al lof such antioxidants are poisonous or, at least deleterious to the health of human beings, and could not, therefore, be used in edible fats and oils.

I am aware that lecithin extracted from vegetable matter, particularly the soya bean, has been used as an antioxidant for oils, especially vegetable oils, but such lecithin presents certain objections. In the first place, soya lecithin has a typical straw-like flavor which is imparted to the fat being treated (particularly if the fat is one of the bland neutral products) when used in concentrations in excess of 0.03%. At concentrations which can be employed without introducing such flavors to the fat, the effectiveness of soya lecithin as an antioxidant is not marked, and is only a fraction of that obtained by my invention. Also, at concentrations of 0.03%, and over, soya lecithin imparts an objectionable color to the product being treated. Furthermore, soya lecithin appears to be quite variable in its antioxidant effectiveness from lot to lot, which may be the result of its preparation in which the lecithin becomes itself oxidized, and thereby detracts from its effectiveness. When soya lecithin is used upon animal products a still further objection resides in the necessity of declaring its presence upon the package or label of the product.

I am also aware that lecithin has been suggested as an emulsifying agent for shortenings specifically, and for the purpose of increasing the shortening qualities of the products. For such use, the concentrations run from 0.2% to 1%, and even greater if desired. Obviously, at such increased concentrations the objectionable flavor and color of the treated product, above referred to, are even more pronounced. My invention differs decidedly from such a process, in that it relates solely to an antioxidant, and that the concentrations of my antioxidant are considerably less than those specified for lecithin as an emulsifier or shortening promoter.

I am furthermore aware that other agents have been proposed as antioxidants for edible fats and oils, but such agents are open principally to the objection that the concentrations necessary to secure effective results give rise to objectionable odors and/or colors in the products, unless followed by a hydrogenation step.

In addition to the effectiveness per se of an antioxidant, and the ease of its incorporation in the fat, certain additional criteria must be observed. In the first place, such an agent obviously must not be injurious to health and should not impart objectionable flavors, colors, or odors to the product treated. Also, it should be non-volatile and soluble in fats and oils, and should not impair the culinary properties of the product. It should also be effective in small concentrations, and should be reasonably cheap and easy to obtain. Preferably in the case of an antioxidant for animal fats and oils, it should be derivable from edible portions of the same type of animal which supplies the fat or oil, in order that the declaration of foreign materials on the packaged product may be dispensed with. Furthermore, such antioxidant should also possess a uniformity among different lots, should be capable of storage for reasonable periods without deterioration, and its antioxidant effect should be carried over into the cooked goods.

To overcome the disadvantages residing in the anti-oxidants heretofore used, and to obtain the desired properties just recited, is the object of my invention.

To achieve this object, and other important objects as will appear hereinafter, my invention in general comprises the use as an antioxidant of certain parts of an animal, such, for instance, as an animal organ or portion of the nervous system of an animal, or certain extractives from such tissues.

As stated, it is desirable that an antioxidant for use with animal fats and oils should preferably be secured from the edible portions of the same type of animal from which the fat or oil is derived. Accordingly, I have conducted experiments which disclose that certain fractions obtained by working up hog, beef and sheep brain show decided antioxidant activity in small concentrations. These fractions comprise certain lipins—including both phospholipins and galactolipins—and also cholesterol. The lipins which I have extracted have been specifically the cerebrosides in combination with sphingomyelin, a fraction consisting largely of kephalin, and lecithin. These fractions have been extracted with boiling alcohol from brain that has been washed, hashed and dried in vacuo. The alcohol is filtered hot and is then allowed to cool. The series of solid fractions are thereby collected, and further purified by washing and precipitation from such solvents as alcohol and acetone. As above stated, in addition to the lipins just enumerated, cholesterol was also obtained by this process.

The effectiveness as antioxidants of all these constituents of the brain, except cholesterol, was demonstrated by a series of tests which show that in as small a concentration as one part in ten thousand such fractions possess antioxidant activity. A sample treated with the brain fraction and an untreated, or control, sample from the same batch were held at 140° in a thermostatically controlled oven in open beakers until rancidity was noted. The results of these tests are set forth below:

*Effectiveness of various brain fractions as antioxidants*

| Fraction used | Concentration | Fat employed | Days to rancidity | | Protection factor |
|---|---|---|---|---|---|
| | | | Untreated | Treated | |
| Cerebrosides and sphingomyelin | 1:200 | Hydrogenated lard | 12 | 56 | 4.7 |
| | 1:100 | Non-hydrogenated lard | 25 | 50 | 2.0 |
| | 1:1000 | Non-hydrogenated lard | 25 | 48 | 1.9 |
| | 1:10000 | Non-hydrogenated lard | 25 | 43 | 1.7 |
| Kephalin | 1:200 | Hydrogenated lard | 12 | 53 | 4.4 |
| Cholesterol | 1:1000 | Non-hydrogenated lard | 25 | 25 | 1 |
| Lecithin | 1:200 | Hydrogenated lard | 15 | 54 | 3.6 |
| | 1:100 | Non-hydrogenated lard | 25 | 50 | 2.0 |
| | 1:1000 | Non-hydrogenated lard | 25 | 50 | 2.0 |
| | 1:10000 | Non-hydrogenated lard | 25 | 36 | 1.45 |

As will be seen from the above, cerebrosides and sphingomyelin, kephalin, and lecithin, all possess potent antioxidant effectiveness.

The difficulty and expense of securing the several individual fractions constitute a serious disadvantage for commercial practice. I have found, however, that the lipin fractions of the brain and cholesterol can be removed directly to the fat phase, by incorporating the brain into the fat or oil to be treated. Several alternative processes may be employed in this connection.

One method of effecting this direct extraction is to thoroughly wash and hash the brain. The hashed brain may then be incorporated in the fat or oil and dried in vacuo at between approximately 60 and 90° centigrade for a period of substantially thirty minutes, accompanied by agitation. The extract obtained in this way was effective as an antioxidant in concentrations of one part of wet brain to 400 parts of fat. However, there is one disadvantage in this process in that an excessive foaming of the fat results during the dehydration and extraction.

Another method of extracting brain fractions in fat may be carried out by drying the washed and hashed brain in vacuo at a temperature not in excess of 150° Fahrenheit. The dried residue may then be introduced into the fat and the desired fractions extracted. As in the preceding method, the fat or oil and brain should be stirred for a period of about thirty minutes while maintained at a temperature of from 60 to 90° C. In this case also I find that concentrations of one part of wet brain to 400 parts of fat effectively retard the development of rancidity in the fat or oil.

In both of the preceding instances, the fat is filtered while hot to remove the brain residue. To facilitate such filtration, but principally to aid in the grinding of dried brain, my preferred process comprises the incorporation of a filter aid with the vacuum dried brain, and then grinding such mixture of brain and filter aid in a roller mill. I find an equal weight of filter aid and brain to be preferable, though, of course, under certain circumstances the proportions may be altered. The use of filter aid is a very real advantage during the grinding stage because the waxy nature of the tissue does not render it well adapted for grinding in the absence of a suitable medium such as a filter aid.

I have found that one part of such mixture in 200 parts of fat constitutes an extremely effective antioxidant—such one to 200 concentration of the mixture mounting to a concentration of one to 400 of the dry brain itself. The amount of extractives obtained in this process is, of course, decidedly less than the brain itself. I have found, for instance, that the extractives constitute only about eight per cent of the original brain, which will mean a concentration of the extractives in the fat of approximately one to 5000.

The fat during the incorporation of the mixture should be at a temperature of between 40 and 100° centigrade, and I have found that a temperature of 60° is usually preferable. The fat and ground mixture should be agitated for a period of substantially thirty minutes.

Upon completion of the extraction, the fat may be passed through a filter press where the filter aid and brain residue are removed. The fat is then ready to solidify and package. While not essential under all circumstances, I prefer to incorporate the antioxidant in the fat immediately before packaging in view of the fact that during the treatment of fats they are ordinarily exposed continuously to the air.

Still another procedure may be by making a concentrated extract, instead of extracting the fractions directly into the fat to be treated, and then incorporating such concentrated extract in the fat as needed. For instance, a concentration of, say, one part of brain to 40 parts of fat may be made up, and then this may be diluted ten times with the fat that is actually to be protected. This concentrated extract may be obtained by any one of the foregoing methods, but preferably I use the process in which the filter aid is employed. I found that in following this alternative, I can obtain protection factors practically identical with those obtained when the fractions are extracted directly into the body of fat to be treated.

As stated above, the amount of extractives from the brain to the fat phase is extremely small, very considerably less than the amount of brain introduced into the fat. And the quantity of each individual fraction extracted is even less. Although I do not wish to be limited in any manner by my theories on the subject, I believe that the effectiveness of such relatively minute quantities of fractions results from the fact that certain, or all, of these fractions serve not only as antioxidants for the fats or oils, but also act as promotors of the antioxidant activity of certain of the other fractions. This may be particularly true of the cholesterol fraction, which, although apparently possessing no antioxidant properties with respect to animal fats and oils, may nevertheless promote the antioxidant effectiveness of the other fractions.

In the foregoing, I have referred to brains of animals generally. Inasmuch as the edible animal fats are principally derived from beef, sheep and hogs, I have conducted experiments on the brains of these three types of animals, and found them to be substantially equally effective. The results are well summarized below, in which the fat treated has been oleo-oil.

filter aid is not as preferable as in the case of the brain, because certain of the animal parts just mentioned are not waxy and do not present the difficulty in grinding that is encountered with the brain.

It will be seen from the foregoing that my invention provides, not only an extremely effective antioxidant, but an agent and process that possess certain ancillary advantages, rendering it particularly valuable for use in the packing industry. When brains, or parts of the nervous system are employed as the antioxidant, the keeping quality of the fats and oils are increased from two to six times, and upwards, depending on the nature of the fat treated and the concentration employed. The improved keeping quality imparted to the fat or oil is carried over into the cooked products.

The antioxidants of my invention are not deleterious to health, and do not detract from the culinary properties of the fat. Employing concentrations which give effective antioxidant Antioxidant effectiveness of beef, hog, and sheep brains

| Kind of brain | Concentration of dried brain | Fat used | Days to rancidity ||Protection factor |
|---|---|---|---|---|---|
| | | | Untreated | Treated | |
| Beef | 1:400 | Oleo oil | 7 | 44 | 6.3 |
| Hog | 1:400 | Oleo oil | 7 | 41 | 5.9 |
| Sheep | 1:400 | Oleo oil | 7 | 40 | 5.7 |

The process used in these tests was in accordance with the third alternative procedure—namely, in which a mixture of filter aid and ground brain was incorporated directly in the fat to be treated and the fractions extracted therein.

It is well known that some antioxidants become prooxygens at certain concentrations and at certain periods of treatment. I have conducted numerous tests, using various concentrations and periods of treatment, but have never discovered an instance where my extractives act as prooxygens.

I have found that the mixture of ground, dried brain and filter aid stands up admirably under storage conditions. For instance, at temperatures ranging from 50° to 98° Fahrenheit, little or no decrease in antioxidant effectiveness takes place up to ninety days or longer. This constitutes a decided advantage over some of the antioxidants heretofore used, in that such prior antioxidants deteriorate rapidly upon storage in air.

I have referred above to the use of animal brains and extractives derived therefrom, but my invention is not limited to the use of such organ and extractives.

I have conducted investigations which show that other parts of the animal body are also effective antioxidants. For instance, the spinal cord and suprarenal cortex are substantially as efficacious as the brain, and provide a protection factor of 5.0 and above in concentrations of 1 to 100. With a similar concentration, the spleen, kidney, lungs and pancreas give a protection factor of 3.5 to 5.0. Fair antioxidant activity is also possible when using the liver, heart, bone marrow, thyroid or lean muscle, which, in a concentration of 1 to 100 afford a protection factor of 1.7 to 3.5. When using these other parts of the animal, the extraction may be effected by any of the procedures discussed above in connection with the brain, although in some instances the use of activity, no foreign flavors or odors are introduced into the product, nor does any change in the color of the product take place.

Brains, and most of the other parts of the animal mentioned above, are derived from the edible portions of the animals, and are thus peculiarly suited for use with animal fats. As pointed out hereinbefore, this is of considerable commercial significance, because it avoids the necessity of declaring on the label or package that there is present a material other than from the animal which supplies the fat. The brain-filter aid mixture is uniform among different lots, and may be stored for reasonable periods without losing its efficacy as an antioxidant.

The process is simple and may be carried out with the ordinary refinery equipment employed for the treatment of fats and oils, and furthermore, the process does not subject the antioxidant to such excessive oxidation as would destroy its efficacy.

The extractives of my invention have also been found to enhance the activity of carotene (itself an antioxidant according to some investigators), which may be present naturally in certain fats such as oleo oil, or which may be added to other fats by the use of palm oil. As will be apparent from the foregoing, relatively negligible amounts of the antioxidants of my invention suffice to effectively retard rancidity, and consequently there is available in any packing house a quantity of antioxidant that is amply sufficient for the treatment of the oil and fat output of such house.

While I have discussed above the treatment of animal fats by my antioxidant, and while it finds particular application in the case of animal fats and oils, I do not wish to be limited thereto. I have found as the result of tests that my antioxidant may be used to retard rancidity in vegetable fats, or mixtures of animal and vegetable fats, with substantially the same efficacy as in the case of animal fats alone.

The term "animal" as used in the specification and claims is not to be narrowly construed, but is used primarily to differentiate from vegetable or plant life, and, as such, may include poultry, fowl or fish, as well as mammals. Also the word "fat" is not restrictively used, but is designed to cover oils, as well as derivatives or compounds of both.

It is, of course, to be understood that the broad concept of my invention, and the details thereof as hereinbefore set forth, are susceptible of various modifications, particularly with respect to temperatures, time and concentrations, which, of course, would vary with the nature of the fat or oil treated and the specific antioxidant employed. The scope of my invention is to be determined solely by the appended claims.

I claim:

1. A method of retarding the oxidation of fats comprising adding to such fats a quite small amount of a lipin-containing part of an animal, retaining the part in the fat a sufficient time to permit the extraction of a major portion of the fat soluble lipins, and then removing the remainder of such part from the fat.

2. A method of retarding the oxidation of fats comprising incorporating with such fats a quite small amount of a hashed and dried lipin-containing organ of an animal, extracting from such organ the lipin constituents thereof, and removing from the fat the residue of the organ after such extraction.

3. A method of retarding the oxidation of fats comprising incorporating with such fats a part of an animal's central nervous system, retaining the part in the fat a sufficient time to permit the extraction of fat soluble lipins therefrom, and then removing the remainder of such part from the fat.

4. A method of retarding the oxidation of fats comprising incorporating with such fats an animal brain, extracting from the brain the lipin constituents and cholesterol and removing from the fat the residue of the organ after such extraction.

5. A method of retarding the oxidation of fats comprising washing and hashing a brain, drying the resultant product, introducing the dried brain into the fat to be treated, agitating the fat-brain mix while maintaining the same at a temperature of from 40 to 100° C., and removing from the fat the residue of the brain after extraction of the lipin constituents thereof.

6. A method of retarding the oxidation of fats comprising incorporating with such fats a mixture of dried brains and a filter aid, extracting from the brains the lipin constituents and cholesterol and removing from the fat the residue of the organ after such extraction and the filter aid.

7. A method of retarding the oxidation of fats comprising incorporating with such fats a mixture of dried brains and a filter aid, at a ratio of substantially one part of the mixture to four hundred parts of the fat, agitating the fat and mixture while maintaining the same at substantially 60–100° C., and then filtering the fat to remove the residue of the mixture.

8. A method of retarding the oxidation of fats comprising incorporating with such fats a hashed brain, and maintaining the mixture at sub-atmospheric pressure and a temperature of substantially 60–90° C. to dehydrate the brain and to extract the lipin constituents thereof.

9. A method of retarding the oxidation of fats comprising extracting fat-soluble lipins from the central nervous system of an animal, and then adding such extractives to the fat.

10. A method of preparing an antioxidant for fats and oils comprising drying a lipin-containing organ, incorporating with such dried organ an equal weight of a filter aid, and grinding the resulting mixture.

11. A fat having antioxidizing properties containing a quite small amount of fat-extracted animal lipins and free from the residue of the animal part from which the lipins were extracted.

WILSON F. DOUGLASS.